US008613867B2

(12) United States Patent
Maggio

(10) Patent No.: US 8,613,867 B2
(45) Date of Patent: Dec. 24, 2013

(54) INORGANIC DRY COMPOSITIONS FOR ABSORPTION OF MERCURY VAPOR

(75) Inventor: Edward T. Maggio, San Diego, CA (US)

(73) Assignee: EcoPaq LLC, Austin, TX (US)

( * ) Notice: Subject to any disclaimer, the term of this patent is extended or adjusted under 35 U.S.C. 154(b) by 485 days.

(21) Appl. No.: 12/847,869

(22) Filed: Jul. 30, 2010

(65) Prior Publication Data

US 2011/0189065 A1 Aug. 4, 2011

Related U.S. Application Data

(60) Provisional application No. 61/230,492, filed on Jul. 31, 2009.

(51) Int. Cl.
- *C09K 3/00* (2006.01)
- *C22B 43/00* (2006.01)
- *C01G 13/00* (2006.01)
- *B01D 53/64* (2006.01)
- *B01D 53/14* (2006.01)

(52) U.S. Cl.
USPC .............................. 252/184; 423/99; 423/210

(58) Field of Classification Search
USPC .................................... 423/99, 210; 252/184
See application file for complete search history.

(56) References Cited

U.S. PATENT DOCUMENTS

| 4,419,107 A * | 12/1983 | Roydhouse ...................... 95/59 |
|---|---|---|
| 2002/0106317 A1 | 8/2002 | Broderick et al. |
| 2003/0104937 A1 | 6/2003 | Sinha |
| 2007/0122327 A1 | 5/2007 | Yang et al. |
| 2008/0229929 A1 | 9/2008 | Marcoon |
| 2008/0307960 A1 | 12/2008 | Hendrickson et al. |
| 2009/0095133 A1 | 4/2009 | Maggio |
| 2009/0101015 A1 | 4/2009 | Hua |

OTHER PUBLICATIONS

AllChem Industries, "Material Safety Data Sheet [for Glycerine]." Published Jan. 3, 2006.*

* cited by examiner

*Primary Examiner* — Stuart Hendrickson
*Assistant Examiner* — Daniel Berns
(74) *Attorney, Agent, or Firm* — DLA Piper LLP (US)

(57) ABSTRACT

The present relates generally to inorganic dry compositions comprising inorganic salt impregnated substrates such as saturated bibulous matrices or non-bibulous coated surfaces allowing fabrication of materials of various shapes and kinds useful to suppress release of mercury vapor into the environment upon breakage of mercury containing lamp bulbs, and methods for the use thereof.

14 Claims, No Drawings

INORGANIC DRY COMPOSITIONS FOR ABSORPTION OF MERCURY VAPOR

CROSS REFERENCE TO RELATED APPLICATION(S)

This application claims the benefit of priority under 35 U.S.C. §119(e) of U.S. Ser. No. 61/230,492, filed Jul. 31, 2009, the entire content of which is incorporated herein by reference.

BACKGROUND OF THE INVENTION

1. Field of the Invention

The present invention relates generally to mercury sorbent inorganic dry compositions and devices incorporating such compositions and specifically to their use to suppress mercury vapor emissions.

2. Background Information

The replacement of incandescent light bulbs with fluorescent light bulbs in order to achieve increased energy efficiency continues to accelerate in home, business, government and academic environments. Government mandates will soon eliminate nearly all sales of incandescent bulbs for routine lighting purposes in the US. While fluorescent light bulbs provide a substantial advantage over incandescent bulbs with respect to energy usage, they contain mercury, which, if released into the air, can pose health risks to exposed individuals. Typical compact fluorescent light bulbs (CFL's) contain approximately 3 to 5 mg of mercury. It has been pointed out that the amount of mercury released into the atmosphere resulting from the eventual breakage or destruction of fluorescent light bulbs represents only a portion of the total mercury contamination in air, the bulk of which appears to result from the burning of fossil fuels such as coal for electrical energy generation. Nevertheless, the health risk to individuals associated with fluorescent light bulbs arises from the potential concentration of mercury vapors in enclosed spaces such as the home or workplace upon breakage. Collection sites for recycling of CFL's and other fluorescent light bulbs afford a particular risk for unwanted exposure to mercury vapor. Individuals involved in the recycling process when in proximity to recycling storage, transport, or processing (for example recovery or disposal) sites are at particular risk. Businesses or organizations housing such recycling sites may incur significant liability as employees, customers or other individuals are inadvertently exposed to mercury vapor.

Recently, methods have been developed to allow the safe transport of CFL's, tubular fluorescent light bulbs, and fluorescent light bulbs of various other shapes. U.S. Patent Application No. 2009/0095133 describes methods and devices for the safe and cost-efficient storage, transport and disposal of mercury containing light bulbs and other mercury containing materials comprising a puncture resistant container having interior element capable of sequestering mercury thus preventing release of mercury vapor into the environment. Mercury sequestering agents are well known to those skilled in the art. They include sulfur, activated carbon impregnated with sulfur as described in U.S. Pat. No. 3,194,629, polymers having free thiol groups such as styrene polymers containing pendent ethane thiol moieties as described in U.S. Pat. No. 4,021,416. Additional examples of free-thiol containing polymers are described in references 4-6. Additional types of sequestering agents are known to complex mercury include activated charcoal, wood char, hydrated aluminosilicate having micro porous structure such as a zeolites and molecular sieves. U.S. Pat. No. 4,534,944 describes a liquid mercury vapor absorbent and suppressant comprising copper ions and thiosulfate ions in water or a water polyol mixture used to immerse mercury. U.S. Pat. No. 4,876,025 describes a liquid mercury vapor absorbent in which the liquid mercury absorbent coats the mercury droplet.

While various liquid absorbents may be effective, they are limited in their use to applications where spillage is not a problem or where the surface of exposure to mercury is relatively concentrated or physically constrained, for example as is the case with droplets of mercury in a container which can be submerged or coated with the mercury absorbing liquid as described in U.S. Pat. No. 4,876,025 and U.S. Pat. No. 4,534,944, that might for example be collected after a spill or in collection of mercury containing dental amalgams and associated fragments obtained during insertion or removal of the amalgams during dental procedures.

SUMMARY OF THE INVENTION

The present invention circumvents these limitations by providing dry compositions that can be fabricated in multiple shapes thus enabling broader or more intimate contact with mercury containing materials having variable and spread-out distribution, as in the case of a shattered mercury containing bulb, or as another example in the case of a collection container where the distribution of mercury containing materials may change as increasing amounts of material are added to the container over the collection period. As a further example of the utility of the dry absorbents of the present invention, cloth or other flexible sheets may by fabricated by impregnation with the dry inorganic absorbents that can be useful in mercury spill clean-up applications by allowing the absorbent to be placed over the contaminated area.

Newly manufactured CFL's as well as tubular and other types of fluorescent bulbs are packaged for shipment from the factory in a variety of packaging shapes and sizes. Typically, packaging involves the use of cardboard boxes of varying shapes and sizes with cardboard partitions separating the bulbs to prevent them from hitting against each other and thus breaking during shipment and handling. Many of the previously described mercury sequestering agents may be enclosed in a sachet and included in such packaging to keep the material from being dispersed. As a practical matter, it is difficult to get such materials into close proximity to all of the bulbs within a package.

Accordingly, the present invention provides inorganic mercury sequestering salt mixtures, which may be dissolved in an aqueous solvent for application and absorption into or onto a substrate. The substrate may subsequently be dried to generate a device for absorption of mercury vapor including a substrate impregnated with a substantially anhydrous inorganic ions for use to package and transport fluorescent bulbs and which may be configured in a wide variety of shapes suitable for packaging or containment purposes.

Accordingly, the present invention provides a device for absorption or sequestering of mercury vapor comprising a substrate impregnated with first and second substantially anhydrous inorganic ions. In various aspects, the substantially anhydrous inorganic ions may be two or more of copper ions, thiosulfate ions, and iodide ions. The device may further include a polyol, such as, a water soluble polyol including, but not limited to propylene glycol, ethylene glycol, and glycerol. In various aspects, the substrate may be a bibulous matrix such as, paper, cellulose, cardboard, paperboard, natural fabric, synthetic fabric, natural fleece, and synthetic fleece. In related aspects, the substrate may be a non-bibulous matrix, such as, plastic, metal, alloy, glass, or resin. The substrate may be provided in a variety of packaging forms, such as planar strips or sheets, or as three dimension structures, such as a particulate composed of a material, such as cellulose, clay, vermiculite, or a zeolite.

In various aspects, the device of the present invention may be configured as an air filter or fume hood filter. Alternatively, the device may be configured for use in a disposable facemask configured to fit over the nose and mouth of a human. Alternatively, the device may be configured for use in a disposable vacuum cleaner bag. Alternatively, the device may be included in a mercury impenetrable resealable container, sized to accommodate one or more mercury containing bulbs. The container may be configured as a recycling container for accommodating a plurality of bulbs, or may be configured as a shipping or packaging container.

The present invention further provides a method of manufacturing a substrate impregnated with a first and a second substantially anhydrous inorganic ion. The method includes contacting the substrate with a first solution comprising a first inorganic ion, drying the substrate to a substantially anhydrous state, contacting the substrate with a second solution comprising a second inorganic ion, and drying the substrate to a substantially anhydrous state, thereby generating a substrate impregnated with a first and a second anhydrous inorganic ion. Alternatively, the substrate may be contacted with a solution including a first and second inorganic ion simultaneously and subsequently drying the substrate to a substantially anhydrous state, thereby generating a substrate impregnated with a first and a second substantially anhydrous inorganic ion.

The invention further provides a method for preventing release of mercury vapor into the environment generated by a mercury containing bulb. The method includes impregnating a substrate with a solution of at least two mercury complexing inorganic salts, drying the impregnated substrate to a substantially anhydrous state, and providing the substrate in a container comprising a mercury vapor containing bulb.

The invention further provides a method of increasing the rate of mercury vapor absorption generated by a broken bulb comprising mercury in a container. The method includes providing the container with a substrate saturated with at least two substantially anhydrous mercury complexing inorganic salts, wherein the substrate is comparable in shape and size to the area occupied by the bulb comprising mercury to reduce the distance between released mercury vapor and the substrate.

DETAILED DESCRIPTION OF THE INVENTION

Before the present devices and methods are described, it is to be understood that this invention is not limited to particular devices, methods, and experimental conditions described, as such devices, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

The present invention provides inorganic mercury sequestering salt mixtures, which may be dissolved in an aqueous solvent for application and absorption into or onto substrates, such as non-bibulous or bibulous materials such as cardboard, paper, or natural fiber or synthetic polymeric cloth materials which may be used to package and transport fluorescent bulbs and which can be configured in a wide variety of shapes suitable for packaging or containment purposes. Upon evaporation of the aqueous solvent or dying to a substantially anhydrous state, the mercury-absorbing inorganic solute or solutes remain impregnated on the non-bibulous material or in the bibulous material.

As used herein, the term 'impregnated' is used to describe a substrate that contains an inorganic salt or ion thereof. For example, an impregnated substrate may include one or more inorganic salts or ions thereof within the matrix of the substrate or coated on the surface of the substrate.

As used herein, the term 'substantially anhydrous' is used to describe a state of matter in which little or no water is present. While substantially anhydrous inorganic salts and/or ions may be completely absent of all water, typically after application to a substrate and drying, the salts and/or ions may include residual moisture content, for example a substantially anhydrous salt or ion may include water of crystallization (water that occurs in crystals but is not covalently bonded to a host molecule or ion). Accordingly, a substantially anhydrous salt or ion may include less than about 5, 4, 3, 2, 1, 0.5, 0.1, 0.05 or 0.01 percent water by weight.

Inorganic salts may also include molecules that allow the substrate to retain flexibility upon application of the salt. A polyol such as ethylene glycol, propylene glycol, polyethylene glycol, polypropylene glycol, glycerol, and the like may be included to retain flexibility of the treated substrate material. Packaging materials, made in such a fashion allow the mercury sequestering agent to be in close proximity to all of the fluorescent bulbs within the packaging. Fluorescent bulbs are often collected in cardboard containers for recycling purposes or may be shipped in cardboard containers from the manufacturing site. The inorganic mercury sequestering salt compositions of the present invention can be used to impregnate the interior portion of the cardboard containers used to collect and store recycled fluorescent bulbs or to transport new fluorescent bulbs, including separators made from cardboard, paper, or other suitable bibulous material in order to reduce or eliminate the escape of mercury vapor from these containers in the event of bulb breakage.

The salt compositions may be applied in a single step in which all the components of the salt solution are first mixed together and then applied in aqueous solution to the substrate material, for example by soaking in, or spraying the salt mixture on to, the substrate. Alternatively, the salts may be incorporated into or onto the substrate by mixing prior to shaping the substrate into its final form. The treatment may be applied in two or more steps as shown in the examples below in which components of the salt solution are applied separately and allowed to combine within the substrate. In addition to water, other water miscible solvents such as ethanol, isopropanol, polyols, and the like may be included.

The mercury-absorbing inorganic salt compositions may be incorporated into a variety of other forms such as coating the interior of collection boxes used at recycling sites, or coating the interior lining of plastic bags having a bibulous interior liner, thus eliminating or reducing exposure to individuals in proximity to collection containers. The mercury-absorbing inorganic salt compositions may also be incorporated in pre-filters used in conjunction with HEPA air filters, thus providing a means of eliminating mercury in the air in the event of a spill. Because the salt mixtures are absorbed, and maybe dried in bibulous materials, they may also be applied to room air filters, air filtering face masks and protective clothing designed to reduce exposure to mercury vapor. Furthermore, by forming the salt mixtures in aqueous solution and then subsequently drying the salt mixtures, either in a neat form, or after absorption into a granular bibulous material, for example cellulosic materials, such as but not limited to, saw dust, shredded paper, non plastic clays, such as but not limited to, montmorillonite or palygorskite, or zeolites, they may be applied in the form of a powder or granular pellets to solid surfaces where mercury exposure is suspected.

A particularly useful application of the powder form of the mercury-absorbing salt mixture is treating carpeting or other materials having rough or complicated surfaces in which the powdered mercury-absorbing salt mixture is first applied to the carpet, allowed to stand for a period of time, for example, one hour, and subsequently removed by vacuuming.

A further useful application is the treatment of cloth with the mercury absorbing inorganic salt mixture. Such cloths can be placed on top of a broken bulb and allowed to stand for a period of time, for example 30 minutes or an hour, to allow mercury vapor emanating from the broken bulb components to be sequestered and bound to the mercury absorbent impregnated cloth.

In various aspects of the present invention, a variety of bibulous materials are envisioned for use in fabricating dry matrix inorganic salt treated substrates (DISTS) so long as the dry matrix is non-reactive with the inorganic salts in a manner that neutralizes the mercury absorption ability.

For example, the list of suitable substrates includes, but is not limited to, bibulous matrix substrates or non-bibulous matrix substrates. Bibulous matrix substrates include any natural or synthetic material that allow for absorption of aqueous inorganic ion within the matrix of the substrate. Such materials may include, for example, paper, cellulose, cardboard, paperboard, natural fabric, synthetic fabric, natural fleece, synthetic fleece, other cellulosic materials including but not limited to cellulose fibers, wood, sawdust, clays, vermiculite, zeolytes, natural or synthetic polymer sponges, polymeric foam sheeting or blocks or loose fill packing material. Non-bibulous matrix substrates include any natural or synthetic material wherein the matrix is densely packed such that aqueous inorganic ions cannot penetrate between inner spaces of the matrix of the substrate. Such materials may include, for example, plastic, metal, alloy, glass, resin and the like.

Substrates of the present invention may be provided in a variety of forms, such as the form of sheets, packaging materials such as bags, boxes, or bulb separators incorporated into packing materials, as loose fill packing material also known as packing peanuts, as container liners for flexible or rigid containers, bag liners, box liners. In a preferred embodiment, the bibulous material is a flat paper or thin foam sheet that when placed in an envelope allows the resulting product to be essentially flat as well as easily foldable allowing for convenient packaging or stacking of multiple products in minimal space.

In various embodiments, the bibulous matrix material may have different shapes and dimensions to correspond to the various geometries of commercially available mercury containing lamp bulbs or the number of such bulbs to be aggregated, or to the configuration of collection and shipping containers. For example, the interior surfaces of cardboard shipping boxes may be treated with the inorganic salt compositions of the current invention. In another embodiment, a box or bag liner, for example flat, fluted, corrugated or cylindrical, of similar dimensions to the enclosed bulb or bulbs may be fabricated so that mercury absorbent material extends throughout the bulk of the container thus maximizing proximity of absorbent to any portion of the interior of the container, thereby increasing the efficiency of mercury absorption.

In various embodiments, the DISTS may comprise cardboard or paper separators between bulbs as well as the body of the packaging box itself, thus simultaneously helping to prevent breakage while providing protection against mercury vapor leakage in the event of lamp breakage.

Mercury containing light bulbs are made in many different forms for different purposes in the home or workplace for many types of exterior or interior applications. The commonality is the threat of mercury vapor release upon breakage. The DISTS of the present invention may be fabricated in a variety of dimensions and shapes sufficient to accommodate mercury containing bulbs of various dimensions and in various numbers. The DISTS may be used in the transport of spent mercury containing light bulbs as well newly manufactured lamp bulbs.

In exemplary embodiments, the bibulous materials may be treated with the aqueous inorganic salts of the present invention in a single step or in multiple steps.

The benefit of using a two-step treatment process is that the mercury absorbing inorganic salt composition is better or more thoroughly impregnated into the bibulous material and less inorganic salt material remains on the surface of the bibulous substrate.

Treatment of the bibulous substrates may be by immersion, or any other means of delivery of the aqueous solution such as spraying, application by roller, printing, or direct inclusion in manufacturing processes used to produce various bibulous materials.

Lastly, the inorganic salts may be formulated in aqueous or mixed aqueous-organic solvents, for example water-alcohol, water-propanol, water-isopropanol, water-methanol, water-propylene glycol, water-ethylene glycol, water-glycerol, water-polyethylene glycol, and the like. While the relative stoichiometry of the various inorganic salts described in the examples is roughly in the ratio of 1:1, it should be understood that this ratio can be varied. In particular, an excess of thiosulfate anion over copper sulfate can be employed to insure the complete in situ conversion of the water soluble copper sulfate to insoluble copper sulfide impregnated in the bibulous matrix. Suitable ratios of thiosulfate ion to copper ion used herein could, by way of example, range from 1.01:1, 1.1:1, 1.5:1, 2:1, or higher. Since copper sulfide is essentially completely insoluble in water because it does not dissociate into positively and negatively charged copper and sulfide ions (respectively), and as observed for copper sulfide bearing copper ores, is therefore stable on a geological timeframe, conversion to copper sulfide eliminates extractable copper ions thus preventing any leaching of copper ions into water from disposed-of bibulous substrate or absorption matrix.

The first and the second inorganic salt are impregnated in a concentration range of approximately 0.15 molar to 1.5 molar.

When short chain alcohols such as methanol, ethanol, propanol, or isopropanol are included in the aqueous solvent, they convey the benefit of speeding the drying process.

In describing the embodiments of the invention, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

EXAMPLE 1

Preparation and Protocol for Mercury Sorbent Substrates

To test the mercury sorbent properties of various substrates, a test bed allowing for measurement of the mercury absorption effectiveness of various substrates under standardized conditions was created using glass canning jars in which a $19/64$th inch hole is drilled in the center of each lid. The hole permits the introduction of the sampling probe attached to a JEROME® 431-X Mercury Vapor Analyzer, manufactured by Arizona Instrument LLC, Chandler, Ariz., USA. The lid is held in place using the canning jar screw-on ring. The jar lid has a rubberized gasket that permits a tight seal with the glass when compressed by application of the screw-on ring preventing loss of air or mercury vapor from the jar. Plastic electrical tape is used to tightly seal the small hole in the center of the canning jar lid. The tape is peeled back briefly during measurements to allow the probe to be inserted. Additional examples are described below which include study results using aluminized Mylar bags or TYVEK® bags as test containers in addition to the canning jars. The Mylar bags are made of three layer laminated aluminized Mylar polypropylene, 8"×12" dimensions, with a stock thickness of 4.5 mil provided by Impak, Los Angeles, Calif. USA.

The concentration of mercury in the air in the test containers was obtained using a JEROME® 431-X Mercury Vapor Analyzer, manufactured by Arizona Instrument LLC, Chandler, Ariz., USA. The Jerome Model 431X analyzer measures mercury vapor in ambient air in the sensitivity range of 0.001 to 0.999 mg/m3 Hg with accuracy of +/−5%. Sampled air is admitted into the analyzer through a hollow metal tube probe of approximately ¼ inch outside diameter. The probe is inserted approximately 2 inches into the container, i.e., glass jar, via the hole in the lid or in the case of the Mylar or TYVEK® bags as described below via a small slit large enough to accommodate insertion of the probe cut into the corner of each bag. In each case, the openings are closed with plastic electrical tape.

The experiments were conducted as follows. Into each container, either a canning jar or a Mylar or TYVEK® bag, is inserted a compact fluorescent lamp bulb and the container tightly sealed using the Zip-Loc closures in the case of the bags or using the jar lid and sealing ring in the case of the canning jars. Light bulbs of either 100 W designated incandescent replacement value or 60 W designated incandescent replacement value were used in the tests. The concentration of mercury in the containers was measured immediately prior to beginning each test by peeling back the electrical sealing, tape seal and inserting the probe of the Jerome model 430 1X analyzer approximately 2 inches into the container and pressing the "Sampling" button. The analyzer draws air out of the container, and it measures the mercury content. Each sampling procedure takes approximately 15 seconds at which time the electrical tape seal is repositioned to prevent escape of air or mercury vapor from the containers. After this initial measurement is completed, the bulb is broken by inserting a metal rod or screwdriver through the opening in the bag and tapping it sharply with a small hammer. The concentration of mercury vapor in the container is immediately measured and the container resealed with electrical tape. From time to time, additional measurements are made over varying periods of time as shown in the data below. Mercury vapor concentrations that exceed the range of the analyzer exhibit a reading of HL on the analyzer LCD display, which indicates that the concentration is greater than 0.999 mg of mercury per cubic meter.

The mercury sorbents sulfur impregnated activated carbon (MERSORB® 1.5, manufactured by Nucon International, Columbus Ohio, USA), hereafter "SIAC", sulfur powder, and bibulous paper such as Whatman No. 1 or No. 3 filter paper treated by submersion in aqueous solutions containing potassium iodide, sodium thiosulfate, copper sulfate, propylene glycol and mixtures thereof and subsequently allowed to dry completely. In some cases as noted below, the paper treatment proceeded in more than one step which was found to produce certain desirable characteristics in the resulting treated paper as noted below. The aqueous solutions used thought the examples used to treat the bibulous filter paper are summarized in Table 1 below. The 1.5 mm SIAC particles are contained in an open mesh sachet that permits easy passage of air and mercury vapor.

TABLE 1

Inorganic Salt Solutions

| Solution No. | Water | Propylene glycol | KI | Thiosulfate | Copper sulfate |
|---|---|---|---|---|---|
| 1 | 90% | 10% | 0 | 0.316M | 0.33M |
| 2 | 90% | 10% | 0.33M | 0.316M | 0.33M |
| 3 | 90% | 10% | 0 | 0.64M | 0.22M |
| 4 | 100% | 0 | 0 | 0.7M | 0 |
| 5a | 90% | 10% | 0.33M | 0.316M | 0 |
| 5b | 100% | 0 | 0 | 0 | 0.33M |

Example 1 demonstrates the measurement of the baseline level of mercury vapor released when a CFL is broken within the glass jar test bed as shown in Table 2. Table 2 also shows addition of 2.14 g of SIAC to the test jar, resulting in a reduction in mercury vapor of 99%.

TABLE 2

Baseline measurement of mercury vapor released with no absorbent present, followed by addition of 2.14 g SIAC, in glass jar test bed

| | Bulb Type - 100 W replacement CFL | |
|---|---|---|
| Time | Hg reading (mg/m3) | % Reduction of Hg Vapor |
| 0 (before break) | 0.000 | |
| 0 (after break) | HL > 0.999 | 0% reduction |
| 570 min | HL > 0.999 | 0% reduction |
| 240 min | HL > 0.999 | 0% reduction |
| Addition of 2.14 g SIAC (t = 0) | HL > 0.999 | 0% reduction |
| 685 min after addition | 0.005 | ≥99.5% reduction |
| 1310 min after addition | 0.003 | ≥99.7% reduction |

EXAMPLE 2

Sequestering of Mercury Vapor by Sulfur Impregnated Activated Carbon

Example 2 demonstrates a reduction in mercury vapor released by breakage of a 60 W replacement CFL in a glass jar test bed in the presence of 700 mg of sulfur impregnated activated carbon, hereafter "SIAL". The reduction in mercury vapor is essentially complete when tested at 36 hours following breakage. A reduction exceeding 90% is achieved in less than 90 minutes. The results are shown in Table 3.

TABLE 3

Mercury Sorbent: 700 mg SIAC in mesh sachet in mesh sachet, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% reduction |
| 15 min | 0.428 | ≥57% reduction |
| 82 min | 0.046 | ≥95% reduction |
| 197 min | 0.068 | ≥93% reduction |
| 437 min | 0.040 | ≥96% reduction |
| 36 hours | 0.000 | 100% reduction |

EXAMPLE 3

Sequestering of Mercury Vapor by Bibulous Substrate Impregnated with Dried Inorganic Salts Example 3 demonstrates a reduction in mercury vapor released by breakage of a 60 W replacement CFL in a glass jar test bed in the presence of 100 cm² of bibulous paper treated with inorganic salt solution number 2 as described in table 1, and subsequently dried to remove water. The dried inorganic salt solution treated substrate, hereafter "DISTS", which substrate in this instance is paper, is seen to be considerably more efficient in reducing mercury vapor since a 100% reduction was observed in 30 minutes. The rate of absorption of mercury vapor is of course dependent upon the rate of diffusion from the source of mercury vapor to the absorbent and the distance needed to be traveled before the mercury atoms encounter the sorbent. Since the DISTS, can be fabricated to cover a large area, up to the entire area of the mercury contaminated area or space, the distance traveled by mercury atoms comprising the mercury vapor before encountering sorbent is minimized thus speeding the rate at which mercury is sequestered. In the present example, the DISTS paper covered a substantial portion of the interior of the Mylar bag. More rapid sequestering of mercury is an important benefit conveyed by the present invention, since subsequent puncture of the Mylar bag by broken glass or other mishandling would result in release of the remaining free mercury vapor that has not yet been sequestered by the sorbent. In the complete absence of a mercury sorbent, essentially all of the mercury vapor would of course be released upon puncturing or opening the bag or other container, for example plastic pails used to collect mercury containing bulbs, resulting in exposure of the environment and any individuals in proximity to opened or punctured containers to mercury vapor. The results are shown in Table 4.

TABLE 4

Mercury Sorbent: 100 cm2 Whatman No. 1 treated with Solution 2 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% reduction |
| 30 min | 0.000 | 100% reduction |
| 275 min | 0.000 | 100% reduction |

EXAMPLE 4

Sequestering of Mercury Vapor by Bibulous Substrate Impregnated with Dried Inorganic Salts Example 4 demonstrates a reduction in mercury vapor released by breakage of a 60 W replacement CFL in a glass jar test bed in the presence of 50 cm² of DISTS prepared using solution number 2 and subsequently dried to remove water. Once again, DISTS treated with inorganic salt solution number 2 is seen to be very efficient achieving a 96% reduction in mercury vapor in 35 minutes. The faster absorption rate seen with DISTS, compared to SIAC, is an important feature of the current invention since the more rapid absorption of mercury vapor in the container reduces the likelihood that mercury vapor would escape the container in the event that the container is compromised by puncture, breakage, and or failure of the container closure. The results are shown in Table 5.

TABLE 5

Mercury Sorbent: 50 cm2 Whatman No. 1 treated with Solution 2 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% reduction |
| 35 min | 0.035 | ≥96% reduction |
| 240 min | 0.003 | ≥99.6% reduction |
| 36 hours | 0.000 | 100% reduction |

EXAMPLE 5

Sequestering of Mercury Vapor by Sulfur Impregnated Activated Carbon

Example 5 demonstrates a reduction in mercury vapor released by breakage of a 60 W replacement CFL in a glass jar test bed in the presence of 300 mg of SIAC enclosed in a mesh sachet. The mesh sachet permits easily handling of the SIAC. Open mesh permits free diffusion of mercury vapor so that it may contact the enclosed SIAC. The reduction in mercury vapor is less than complete achieving a maximum reduction of approximately 32%, demonstrating that sufficient SIAC should be used to prevent saturation and the incomplete absorption of mercury vapor. The results are shown in Table 6.

TABLE 6

Mercury Sorbent: 300 mg SIAC in mesh sachet, in glass jar test bed

Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% reduction |
| 120 min | 0.774 | ≥23% reduction |
| 180 min | 0.999 | 0% reduction |
| 11 hours | 0.678 | ≥32% reduction |
| Add 1.5 g SIAC and retest at 36 hours | 0.000 | 100% reduction |

EXAMPLE 6

Sequestering of Mercury Vapor by Bibulous Substrate Impregnated with Dried Inorganic Salts Example 6 is similar to example 3 with the exception that the surface area of DISTS prepared using solution number 2 is reduced to 50 cm$^2$. Mercury vapor is reduced by a maximum estimated amount of approximately 52% indicating that the amount of mercury present in this particular test exceeds the capacity of the 50 cm$^2$ of sorbent. The results are shown in Table 7.

TABLE 7

Mercury Sorbent: 50 cm2 Whatman No. 1 treated with Solution 3 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 60 min | 0.999 | 0% |
| 120 min | 0.516 | ≥52% |
| 180 min | 0.553 | ≥45%% |
| 11 hours | 0.428 | ≥43% |
| Add 1.5 g SIAC and retest at 36 hours | 0.000 | 100% |

EXAMPLE 7

Sequestering of Mercury Vapor by Bibulous Substrate Impregnated with Dried Inorganic Salts Example 7 is similar to example 6 except that the surface area of the DISTS is increased to 100 cm$^2$. This amount of surface area is sufficient to essentially achieve 100% absorption of the mercury released upon bulb breakage. The results are shown in Table 8.

TABLE 8

Mercury Sorbent: 100 cm2 Whatman No. 1 treated with Solution 2 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 60 min | 0.039 | ≥96.1% |
| 120 min | 0.016 | ≥98.4% |
| 180 min | 0.020 | ≥98% |
| 11 hours | 0.000 | 100% |

EXAMPLE 8

Sequestering of Mercury Vapor by Bibulous Substrate Impregnated with Dried Inorganic Salts Example 8 utilized a TYVEK® bag in place of a glass jar test bed and utilized 77 cm$^2$ of DISTS prepared using solution 2. Sequential measurements of mercury vapor in the TYVEK® bag following bulb breakage indicated a rapid decline of greater than 99% of mercury vapor in 10 minutes. In example 10 below, it is seen that mercury vapor declines rapidly in the TYVEK® bag in the absence of sorbent indicating that mercury is rapidly leaking from the TYVEK® bag rather than being absorbed by a sorbent. This is confirmed in example 11 in which TYVEK® material was placed in a glass test bed to determine if TYVEK® itself acts as a sorbent. It is seen in example 11, that TYVEK® has no meaningful intrinsic absorption capacity for mercury vapor thus confirming that the reduction in the apparent mercury vapor concentration is result of leakage from the TYVEK® bags. The results are shown in Table 9.

TABLE 9

Mercury Sorbent: 77 cm2 Whatman No. 1 treated with Solution 2 and dried, in 6" × 9" TYVEK ® Bag, adhesive closure Bulb Type - 100 W replacement CFL

| Time | Hg reading (mg/m3) | % Reduction of Hg Vapor |
|---|---|---|
| 0 (before break) | 0.000 | |
| 0 (after break) 15 sec | 0.634 | ≥37% |
| 30 sec | .431 | ≥57% |
| 45 sec | .213 | ≥80% |
| 60 sec | .076 | ≥92% |
| 75 sec | .050 | ≥95% |
| 90 sec | .037 | ≥96% |
| 105 sec | .031 | ≥97% |
| 120 sec | .035 | ≥96% |
| 10 min | .003 | ≥99% |
| 110 min | .000 | 100% |

EXAMPLE 9

Sequestering of Mercury Vapor by Bibulous Substrate Impregnated with Dried Inorganic Salts Example 9 demonstrates a reduction in mercury vapor released by breakage of a 60 W replacement CFL in a glass jar test bed in the presence of 50 cm$^2$ of DISTS prepared using solution number 3 and subsequently dried to remove water.

DISTS prepared using solution 3 is seen to be ineffective in absorbing mercury. The results are shown in Table 10.

TABLE 10

Mercury Sorbent: 50 cm2 Whatman No. 3 treated with Solution 4 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 25 min | HL > 0.999 | 0% |
| 85 min | HL > 0.999 | 0% |

EXAMPLE 10

Leakage of Mercury from Containers

Example 10 demonstrates the leakage of mercury vapor from the TYVEK® bag used in this example as described above in the explanation of example 8. The results are shown in Table 11.

TABLE 11

No mercury Sorbent control, 6" × 9" TYVEK ® Bag, adhesive closure

Bulb Type - 100 W replacement CFL

| Time | Hg reading (mg/m3) | % Reduction of Hg Vapor |
|---|---|---|
| 0 (before break) | 0.000 | |
| 10 sec | 0.197 | ≥80% |
| 30 sec | 0.103 | ≥90% |
| 50 sec | 0.051 | ≥95% |
| 70 sec | 0.035 | ≥96% |
| 90 sec | 0.027 | ≥97% |
| 150 sec | 0.020 | ≥98% |
| 270 sec | 0.015 | ≥98% |

EXAMPLE 11

Determination of Mercury Sorbent Property of Tyvek®

Example 11 demonstrates that TYVEK® has no meaningful intrinsic absorption capacity for mercury vapor. The results are shown in Table 12.

TABLE 12

TYVEK ® in jar, control- no mercury sorbent

Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 15 min | HL > 0.999 | 0% |
| 60 min | HL > 0.999 | 0% |

EXAMPLE 12

Sequestering of Mercury Vapor by Bibulous Substrate Impregnated with Dried Inorganic Salts Example 12 demonstrates that 50 cm$^2$ DISTS prepared with solution 2 achieves a maximum reduction in mercury vapor of approximately 90%, indicating that the amount of mercury present in that particular test bulb exceeded the capacity of this amount of surface area. The results are shown in Table 13.

TABLE 13

Mercury Sorbent: 50 cm2 Whatman No. 3 treated with Solution 2 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | 0.629 | 0% |
| 13 min | 0.099 | 84% |
| 26 min | 0.049 | 92% |
| 205 min | 0.107 | 83% |
| 9 hrs 25 min | 0.124 | 80% |
| 33 hrs 15 min | 0.062 | 90% |

EXAMPLE 13

Sequestering of Mercury Vapor by Sulfur Impregnated Activated Carbon

Example 13 demonstrates the effectiveness of 300 mg of SIAC. Once again, a binding capacity of 300 mg of SIAC appears to be exceeded by the amount of mercury present in the bulb used in this example since the maximum observed reduction in mercury vapor was approximately 83%. The results are shown in Table 14.

TABLE 14

Mercury Sorbent: 300 mg SIAC in mesh sachet, in glass jar test bed

Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 15 min | 0.406 | ≥59% |
| 620 min | 0.169 | ≥83% |
| 735 min | 0.169 | ≥83% |
| 34 hrs 10 min | 0.196 | ≥80% |

EXAMPLE 14

Mercury Impregnable Containers

Example 14 demonstrates that the Ziploc sealed Mylar Ziploc bag as described above, contains essentially all mercury vapor released upon breakage of a CFL for at least 24 hours. The results are shown in Table 15.

TABLE 15

Retention of mercury vapor in Mylar bag with Ziploc closure in the absence of mercury sorbent Bulb Type - 100 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 1 hour | HL > 0.999 | 0% |
| 8 hours | HL > 0.999 | 0% |
| 14 hours | HL > 0.999 | 0% |
| 25 hours | HL > 0.999 | 0% |

EXAMPLE 15

Sequestering of Mercury Vapor by Sulfur Impregnated Activated Carbon

Example 15 demonstrates that 1.8 grams of SIAC present in a Mylar Ziploc bag as described above provides an effective means of confining mercury vapor and demonstrates that the mercury vapor is very rapidly reduced by approximately 47% within 15 seconds and approximately 99% in about five hours. The results are shown in Table 16.

TABLE 16

Mercury Sorbent: 1.8 g SIAC in mesh sachet, in Mylar bag, Ziploc closure

Bulb Type - 100 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 15 sec | 0.532 | ≥47% |
| 215 min | 0.200 | ≥80% |
| 310 min | 0.014 | ≥99% |
| 35 hours | 0.018 | ≥98% |

EXAMPLE 16

Sequestering of Mercury Vapor by Bibulous Substrate Impregnated with Dried Inorganic Salts Example 16 demonstrates that 90 cm² of DISTS prepared with solution 2 present in a Mylar Ziploc bag as described above provides an effective means of confining mercury vapor and demonstrates that the mercury vapor is rapidly sequestered and that 100% reduction in mercury vapor is achieved. The results are shown in Table 17.

TABLE 17

Mercury Sorbent: 90 cm2 Whatman No. 3 treated with Solution 2, in Mylar bag, Ziploc closure Bulb Type - 100 W replacement CFL

| Time | Hg reading (mg/m3) | % Reduction of Hg Vapor |
|---|---|---|
| 0 (before break) | 0.000 | |
| 0 (after break) | 0.109 | 0% |

TABLE 17-continued

Mercury Sorbent: 90 cm2 Whatman No. 3 treated with Solution 2, in Mylar bag, Ziploc closure Bulb Type - 100 W replacement CFL

| Time | Hg reading (mg/m3) | % Reduction of Hg Vapor |
|---|---|---|
| 234 min | 0.000 | 100% |
| 310 min | 0.000 | 100% |

EXAMPLE 17

Sequestering of Mercury Vapor by Elemental Sulfur

Example 17 demonstrates that 1 g of elemental sulfur in a fine powder form is ineffective in absorbing mercury vapor in a glass jar test bed. The results are shown in Table 18.

TABLE 18

Mercury Sorbent: 1 g. elemental sulfur fine powder, in glass jar test bed

Bulb Type - 60 W replacement CFL

| Time | Hg reading (mg/m3) | % Reduction of Hg Vapor |
|---|---|---|
| 0 (before break) | 0.000 | |
| 0 (after break) | HL > 0.999 | 0% |
| 90 min | HL > 0.999 | 0% |
| 23 hrs 40 min | HL > 0.999 | 0% |

EXAMPLE 18

Sequestering of Mercury Vapor by Bibulous Substrate Impregnated with Dried Inorganic Salts Example 18 demonstrates that bibulous materials other than filter paper may be used as a substrate or matrix for absorption of solution 2. In this example, 80 cm² of cardboard obtained from the packing separator in commercially available CFL packaging is treated with solution number 2 and dried. Following breakage of the CFL in the glass test glass jar test bed, the mercury vapor was seen to be reduced by approximately 94% in less than one hour. The results are shown in Table 19.

TABLE 19

Mercury Sorbent: 80 cm2 card board CFL Packing separator treated with Formulation # 2 and dried, in glass jar test bed Bulb Type - 60 W replacement CFL

| Time | Hg reading (mg/m3) | % Reduction of Hg Vapor |
|---|---|---|
| 0 (before break) | 0.000 | |
| 0 (after break) | 0.618 | 0% |
| 35 min | 0.038 | ≥94% |
| 65 min | 0.053 | ≥93% |

EXAMPLE 19

Process of Manufacturing a Bibulous Substrate Impregnated with Dried Inorganic Salts Example 19 demonstrates that DISTS may be prepared in a two-step coating process employing solutions 5a. and 5b.

Filter paper discs with a surface area of 80 cm² are immersed in solution 5a and dried overnight. The filter paper discs were then immersed in solution 5b and dried overnight. This two-step process provides for more intimate incorporation of the resulting inorganic salt composition within the matrix of the bibulous material itself. Upon testing in a glass jar test bed, as described above, mercury vapor was seen to be reduced by approximately 78% within 15 minutes and greater than approximately 92% in less than three hours. The results are shown in Table 20.

TABLE 20

Mercury Sorbent: 2-Step coated (solutions 5a and 5b) 80 cm2 filter paper, in glass jar test bed Bulb Type - 60 W replacement CFL

| Time | Hg reading (mg/m3) | % Reduction of Hg Vapor |
| --- | --- | --- |
| 0 (before break) | 0.000 | |
| 0 (after break) | HL > 0.999 | 0% |
| 15 min | 0.216 | ≥78% |
| 40 min | 0.138 | ≥86% |
| 68 min | 0.110 | ≥89% |
| 143 min | 0.082 | ≥92% |

It is noted that the amount of mercury vapor released from different bulbs varied over a wide range. The 50 cm² DISTS prepared using solution number 2 and the 300 mg amount of SIAC removed nearly all mercury vapor from some bulbs, but appears to have been saturated by the larger amount of mercury from other bulbs leaving some mercury vapor free in the container. Therefore the minimum amount of SIAC in a preferred embodiment of the present invention should be sufficient to accommodate the largest amount of mercury likely to be included in fluorescent bulbs from different manufactures and in different sizes and shapes produced by the industry. For a CFL, approximately 1-2 g of SIAC is appropriate for most applications. For larger bulbs, for example linear tubular fluorescent bulbs, the amount of absorbent may be considerably larger. Similarly, where multiple bulbs are intended to be included in the same container, a correspondingly increased amount of sorbent should be used in proportion to the increased mercury load in the event that all bulbs break thus releasing the full mercury vapor load into the container. In most applications, an excess of the mercury sorbent should be used in order to allow for variations in bulb mercury content. While specific concentrations of inorganic salts are presented in table 1, it should be recognized that by increasing the concentration of the salts in the aqueous solution used to treat the bibulous material, an increased density of the dried salts in the bibulous material may be obtained thus providing for increased absorption capacity for mercury vapor. The upper limit of the salt concentrations which may be used in the present invention is essentially determined by the solubility of the salts in the aqueous or mixed aqueous-organic solvent.

EXAMPLE 20

Sequestering of Mercury Vapor by Corrugated Cardboard

Objective 1 of this study was to determine the effectiveness and utility of a single-sided corrugated cardboard as a matrix for mercury absorption. Background: The purpose of this study was to explore the use of a single sided corrugated cardboard to serve as both a matrix for absorption of inorganic salt solutions and to determine if the use of the single-sided corrugate would also serve as a shield against puncture of the plastic bag liner upon breakage or implosion of fluorescent bulbs. In earlier studies it was determined that on occasion, shards of glass from the breaking or imploding glass punctured the plastic liner bag, resulting in mercury release. Single-sided corrugate was chosen because it has approximately 1.4 times the surface area of a solid sheet as a result of the corrugated or ridged nature of the cardboard liner. Secondly, it is an inexpensive substrate. Thirdly, it is very flexible and previously it was determined that inserting a solid two sided corrugated cardboard liner was very difficult since the rigidity of the liner caused the liner to get caught up in the plastic bag. Forcing the two sided corrugated into the plastic bag could result in tears of the plastic bag thus defeating the purpose of the plastic bag.

Objective 2 of this study was to compare the single-sided corrugate including inorganic salts with corrugate including SIAC as an absorption matrix. Background: The purpose of this second objective was to determine the relative efficiency of the larger surface area afforded by a single-sided corrugate treated with inorganic salt solution compared to SIAC. The concept here is that mercury escaping from a broken bulb will have to diffuse inside the plastic liner bag until it reaches the mercury absorbent at which point the mercury will be immobilized. Having a liner that covers, as much as possible, the full interior dimensions of the plastic liner bag would reduce the distance that mercury vapor would have to travel before encountering a mercury sorbent. This should speed the rate of absorption of mercury. In the event of a subsequent puncture or in the event that the liner is deliberately opened to allow additional bulbs to be added or to allow removal of bulbs at the recycling facility, the likelihood that mercury vapor will be released into the environment is reduced or eliminated by speedier capture.

Objective 3 of the example was to determine if a drying step was necessary between applications of two inorganic salt solutions. Background: The reason that the inorganic salt solutions are applied in two separate steps is to allow chemical reaction between the specific salts, resulting in the in situ formation of copper sulfide impregnated within the paper. If the two solutions are mixed in advance, copper sulfide begins to form immediately and because copper sulfide is insoluble, unlike the salts used to form the copper sulfate, the copper sulfide begins to come out of solution and cannot impregnate the paper. It would be desirable if no drying step is necessary between the first and second solution application steps since this would reduce manufacturing costs and manufacturing time. One objective of this study was to determine if the drying step between applications of solutions one and two could be omitted.

The following impregnation procedures were followed. The 0.1M corrugate sheet was prepared with drying between the two spray steps. The 0.33M corrugate sheet was prepared with no drying between steps. Drying between steps is not necessary and may be sub-optimal since allowing the salts to mix while wet may increase the extent of completion of the reaction. Elimination of the first drying step is expected to speed production and reduce labor.

Spraying was accomplished by laying out a 4"×4" grid pattern on the corrugate sheets and in the case of the 0.1M sheet, spraying in the center of each grid box and also at the intersection of the grid lines. For the 0.33M sheet, the concentration in the spray pump was doubled and only the box centers were sprayed, thus delivering the desired amount of salts in one-half the liquid volume, to allow for shorter drying time.

The solutions applied to the 0.1 M sheet were as follows: the first solution was comprised of 0.1M sodium thiosulfate and 0.1M potassium iodide in 10% aqueous propylene glycol. The second solution was 0.1M copper sulfate in water.

The solutions applied to the 0.33M sheet were as follows: the first solution was comprised of 0.1M sodium thiosulfate and 0.33M potassium iodide in 10% aqueous propylene glycol. The second solution was 0.33M copper sulfate in water.

The corrugate sheets were used as liners of various collection devices referred to as EcoLights CFL Recycling Stations™. The collection devices include a container, such as a cardboard box configured to house lights of a particular number and shape (e.g., 1-50, 4 foot fluorescent tube lights, a mercury vapor sealable liner (e.g., plastic) and impregnated inner liner as described herein. A hole may be disposed in the top of the box to allow bulbs to be placed in the container.

The following conclusions were deduced from the study with detailed results shown below. First, the impregnated single sided corrugated cardboard proved to be a superior sorbent by a wide margin. Even after the 42 (four foot tube bulbs) bulb-break experiment, the "used" corrugate had superior and very high residual capacity. Second, the corrugate also was shown to meet the requirement of protecting the bag liner from punctures when bulbs implode which is beneficial for practical use since the configuration should avoid penetration of the liner whether by double boxing or via this type of liner or other puncture proof liner. Third, the corrugate liner works well for the configurations described as EcoLights CFL Recycling Stations™. It reduces escape of Hg even when the optional top hole is open. Without the corrugate liner, the Hg escapes into the room since the vapor barrier may not be sealed yet. A plastic flap over the hole may also be utilized in retaining Hg to allow time for the corrugate to soak up more of the Hg. Fourth, SIAC works much slower in Hg sequestration as compared to inorganic salts.

The conclusions above are based on the following experimental results.

Experiment 1: Control retest of Mason jar test bed. Result (Table 21): Mason jar retains mercury as expected. Control successful.

TABLE 21

Experiment 1

■ Standard Mason jar □ Large Mason jar □ Uline bag or □ EcoLite bag
100 W bulb□    60 W bulb■    4' Tube□

| Time after break | | Sorbent: No Sorbent Control |
|---|---|---|
| Time | Min. | Hg reading (mg/m3) |
| 12:34 | 0 | HL |
| 12:39 | 5 | HL |
| 1:19 | 45 | HL |
| 2:04 | 90 | HL |

Experiment 2: 0.1 M impregnated 10×10 cm single-sided corrugate. Result (Table 22): 0.1 M impregnated corrugate achieves a 95% reduction in approximately 20 minutes.

TABLE 22

Experiment 2

■ Standard Mason jar □ Large Mason jar □ Uline bag or □ EcoLite bag
100 W bulb□    60 W bulb■    4' Tube□

| Time after break | | Sorbent: 0.1M Impreg. 10 × 10 cm Single Sided Corrugate | | |
|---|---|---|---|---|
| Time | Min. | Hg reading (mg/m3) | | |
| 12:34 | 0 | HL (7.6) | 100% | T-zero start |
| 12:39 | 5 | 0.616 | 8.10% | est. 7.6 |
| 12:56 | 22 | 0.365 | 4.80% | |
| 1:04 | 30 | 0.199 | 2.60% | |
| 1:18 | 44 | 0.091 | 1.10% | |
| 1:56 | 82 | 0.051 | 0.70% | |
| 2:36 | 122 | 0.04 | 0.50% | |

Note:
Based on 140 oz. jar expts, conc in std mason jar at breakage estimated to be 7.60 mg/m3

Experiment 3: 0.33 M bogus paper previously prepared. Result (Table 23): This sample of bogus paper achieved 97% reduction in seven minutes. This sample was prepared at least 2 months before testing, and proved to be completely stable.

TABLE 23

Experiment 3

■ Standard Mason jar □ Large Mason jar □ Uline bag or □ EcoLite bag
100 W bulb□    60 W bulb■    4' Tube□

| Time after break | | Sorbent: 0.33M Bogus paper prepared previously - 10 × 10 cm |  |
|---|---|---|---|
| Time | Min. | Hg reading (mg/m3) | |
| 12:52 | 0 | HL | 100% |
| 12:59 | 7 | 0.21 | 2.80% |
| 1:57 | 58 | 0.018 | 2.30% |
| 2:37 | 98 | 0.004 | 0.05% |
|  |  | 0.003 | 0.03% |

Experiments 4. Large 140 ounce jar to see if old bulbs have less mercury. Result (Table 24): See below.

TABLE 24

Experiment 4

Standard Mason jar ■ Large Mason jar □ Uline bag or □ EcoLite bag
100 W bulb□    60 W bulb■    4' Tube□

| Time after break | | Large 140 Oz Jar - to see if old bulb has less Hg |
|---|---|---|
|  |  | Large 140 Oz Jar - to see if old bulb has less Hg - No Sorbent - Old Bulb |
| Time | Min. | Hg reading (mg/m3) |
| 1:07 | 0 | ND |
| 1:13 | 6 | 0.635 |

Experiment 5. Large 140 ounce chart to see if new bulbs have more mercury. Result (Table 25): Due to variability it was not possible determine if there is a difference between old and new bulbs

TABLE 25

Experiment 5

Standard Mason jar ■ Large Mason jar ☐ Uline bag or ☐ EcoLite bag
100 W bulb☐ 60 W bulb■ 4' Tube☐

| Time after break | Large 140 Oz Jar - to see if old bulb has less Hg - No Sorbent - New Bulb | |
|---|---|---|
| Time | Min. | Hg reading (mg/m3) |
| 1:39 | 0 | |
| 1:45 | 0.108 | |
| 1:47 | 0.36 | (second break) |

Experiment 6. EcoLights CFL Recycling Station™ for 4 foot tube lights—full 0.1 M corrugate liner—(7 bulbs). Result (Table 26): In this test, a total of seven bulbs were broken in the 4 foot tube device. The sorbent concentration was 0.1 molar. A reduction of about 93% was achieved over about four hours.

TABLE 26

Experiment 6

Standard Mason jar ☐ Large Mason jar ☐ Uline bag or ☐ EcoLite bag
100 W bulb☐ 60 W bulb 4' Tube■

| Time after break | EcoLights CFL Recycling Station ™ - 4 Foot Tube Box - Full 0.1M corrugate liner - 4 bulbs plus 3 bulbs = 7 bulbs Sorbent: Full 0.1M corrugate liner 4' × 4' | | |
|---|---|---|---|
| Time | Min. | Hg reading (mg/m3) | |
| 2:40 | 0 | 0.487 | 100% |
| 2:55 | 15 | 0.027 | 5.50% |
| 3:20 | broke 3 more bulbs | | |
| 3:50 | 70 (30) | 0.363 | 100% |
| 5:00 | 140 (100) | 0.031 | 8.50% |
| 6:30 | 230 (190) | 0.079 | 21.80% |
| 7:45 | 305 (265) | 0.023 | 6.30% |

Experiment 7. 100 cm$^2$ impregnated corrugate 0.33 M. Result (Table 27): A 100 cm square 0.33 molar corrugate appear to be extremely effective as absorption. Greater than 99% reduction was achieved in 15 minutes or less.

TABLE 27

Experiment 7

■ Standard Mason jar ☐ Large Mason jar ☐ Uline bag or ☐ EcoLite bag
100 W bulb☐ 60 W bulb■ 4' Tube☐

| Time after break | Sorbent: 100 cm2 0.33M corrugate | | |
|---|---|---|---|
| Time | Min. | Hg reading (mg/m3) | |
| 7:55 | 0 | HL | 100% |
| 8:10 | 15 | 0.051 | 0.70% |
| 8:25 | 30 | 0.043 | 0.60% |
| 8:40 | 55 | 0.025 | 0.30% |
| 7:50 AM | 790 | 0.029 | 0.40% |

Experiment 8. 4'×4' full 0.33 M corrugate liner—42 bulb break. Result (Table 28): This was a test of a full 4'×4' 0.33 molar corrugate liner. A total of 42 bulbs were broken in the box and 90% reduction was achieved in approximately 30 minutes. The mercury concentration continues to decline to about a 98% reduction. The concentration of mercury in the box after about six hours was below the acceptable eight hour OSHA concentration level (i.e., it was 49 micrograms per m$^3$ vs. the NIOSH limit of 50 micrograms per m$^3$). Since this was the concentration within the bag, the concentration in the surrounding environment obviously would be undetectable. The 0.33 molar corrugate is clearly an effective absorbent for this application.

TABLE 28

Experiment 8

42 Bulb Break
■ Standard Mason jar ☐ Large Mason jar ☐ Uline bag or ☐ EcoLite bag

| Time after break | Sorbent: Full 0.33M corrugate liner 4' × 4' | | |
|---|---|---|---|
| Time | Min. | Hg reading (mg/cm3) | |
| prebreak | | 0.011, 0.000, 0.008 | |
| 11:50 | 0 | HL(2.922) | 100% |
| 12:20 | 30 | 0.299 | 10.00% |
| 12:50 | 60 | 0.199 | 6.80% |
| 3 PM | 190 | 0.179 | 6.00% |
| 5 PM | 310 | 0.106 | 3.60% |
| 6:15 | 385 | 0.049 | 1.70% |
| 8:35 PM | 525 | 0.028 | 1.00% |
| 4/21 7:45 AM | 1195 | 0.082 | 2.80% |
| 12:20 PM | 1470 | 0.018 | 0.60% |
| 5:50 PM | 1800 | 0.041 | 1.40% |
| 8 PM | 1930 | 0.059 | 2.00% |
| 4/21 9 PM | 1990 | 0.078 | 2.70% |
| 4/22 8 AM | 2650 | 0.006 | 0.20% |
| 12 noon | 2890 | 0.075 | 2.60% |

Note:
7 bulbs gave >0.487, so 42 bulbs was estimated at >2.922

Experiment 9. Out-gassing from used 4 foot by 4 foot 0.33 M corrugate. Result (Table 29): This experiment was done to determine if a previously used sheet of impregnated corrugate were left in the open environment would any of the absorbed mercury out-gas and go into the environment. The 4'×4' used corrugate from experiment 8 was placed in a fresh container device fitted with a sampling port. Not only was there no out-gassing, the very low level initially observed progressed to zero after approximately 2 hours. Presumably, the low-level of observed mercury initially detected was the result of powdered glass or phosphor that adhered to the surface of cardboard. Thus, even residual mercury present from this source was completely absorbed and removed from the atmosphere.

TABLE 29

Experiment 9

Standard Mason jar ☐ Large Mason jar ☐ Uline bag or ☐ EcoLite bag
100 W bulb☐ 60 W bulb 4' Tube☐

| Time after break | Outgassing from Used 4' × 4' 0.33M corrugate (from Experiment 8 above) Sorbent: N/A | |
|---|---|---|
| Time | Min. | Hg reading (mg/m3) |
| 7:30 | 0 | 0.012 |
| 8:30 | 60 | 0.003 |
| 9:40 | 130 | 0 |

Experiment 10. 50 cm$^2$ impregnated corrugate 0.33 M. Result (Table 30): In this experiment reduction in the surface area using 0.33 molar impregnated corrugate was investigated. Even 50 cm$^2$ (one-half of the usual 100 cm$^2$) provided excellent absorbent capacity and greater than 97% reduction in mercury vapor was achieved at 15 minutes.

TABLE 30

Experiment 10

■ Standard Mason jar □ Large Mason jar □ Uline bag or □ EcoLite bag
100 W bulb□    60 W bulb■    4' Tube□

| Time after break | | Sorbent: Impreg. Corrugate Conc. 0.33 50 cm$^2$ | |
|---|---|---|---|
| Time | Min. | Hg reading (mg/m3) | |
| 7:30 | 0 | HL | 100% |
| 7:45 | 15 | 0.187 | 2.50% |
| 8:00 | 30 | 0.051 | 0.70% |
| 8:15 | 45 | 0.025 | 0.30% |
| 8:32 | 62 | 0.021 | 0.30% |
| 9:00 | 90 | 0.006 | 0.00% |

Experiment 11. 25 cm$^2$ impregnated corrugate 0.33 M. Result (Table 31): A further reduction in the surface area to 25 cm$^2$ still demonstrated a greater than 97% reduction at 30 minutes indicating that the corrugated sorbent is an excellent substrate and has very high absorption capacity providing a significant margin of overcapacity. At this rate, a 4'×4' sheet of treated corrugate would correspond to 594 25-cm$^2$ squares, or would have the capacity to absorb mercury from 594 CFLs.

TABLE 31

Experiment 11

■ Standard Mason jar □ Large Mason jar □ Uline bag or □ EcoLite bag
100 W bulb□    60 W bulb■    4' Tube□

| Time after break | | Sorbent: Impreg. Corrugate Conc. 0.33 25 cm$^2$ | |
|---|---|---|---|
| Time | Min. | Hg reading (mg/m3) | |
| 7:30 | 0 | HL | 100% |
| 7:45 | 15 | 0.306 | 4.00% |
| 8:00 | 30 | 0.184 | 2.40% |
| 8:15 | 45 | 0.087 | 1.10% |
| 8:32 | 62 | 0.05 | 0.60% |
| 9:00 | 90 | 0.071 | 0.90% |

Experiment 12. 100 cm$^2$ impregnated corrugate 0.33 M. Result (Table 32): This was another test of 0.33 molar corrugate 100 cm$^2$. Greater than 99% absorption was observed at the 15 minute time point.

TABLE 32

Experiment 12

■ Standard Mason jar □ Large Mason jar □ Uline bag or □ EcoLite bag
100 W bulb□    60 W bulb■    4' Tube□

| Time after break | | Sorbent: Impreg. Corrugate Conc. 0.33 100 cm2 REUSED AFTER 42 BULB EXPERIMENT. - RESIDUAL Capacity after use | |
|---|---|---|---|
| Time | Min. | Hg reading (mg/m3) | |
| 9:07 PM | 0 | HL | 100% |
| 9:22 | 15 | 0.025 | 0.30% |
| 9:37 | 30 | 0.000 | 0.00% |

Experiment 13. 1.8 g SIAC. Result (Table 33): In this experiment 1.8 g SIAC was tested. While absorption capacity is significant, it took an unexpectedly long time to get below 90% reduction although data points were not taken at certain time intervals.

TABLE 33

Experiment 13

■ Standard Mason jar □ Large Mason jar □ Uline bag or □ EcoLite bag
100 W bulb□    60 W bulb■    4' Tube□

| Time after break | | Sorbent: 1.8 g SIAC | |
|---|---|---|---|
| Time | Min. | Hg reading (mg/m3) | |
| 9:40 pm | 0 | HL | 100% |
| 9:55 | 15 | HL | |
| 10:10 pm | 30 | HL | |
| 7:40 am | 600 | 0.735 | 9.70% |
| 1:40 pm | 960 | 0.458 | 6.00% |
| 3:30 | 1060 | 0.29 | 3.80% |
| 5:10 | 1100 | 0.382 | 5.00% |
| 7 PM | 1180 | 0.336 | 4.40% |
| 7:30 | 1210 | 0.434 | 5.70% |
| 8 PM | 1240 | 0.474 | 6.20% |
| 9:40 PM | 1340 | 0.375 | 4.90% |
| 11 AM | 2020 | 0.374 | 4.90% |

Experiment 14. Untreated corrugate control. Result (Table 34): In this experiment normal escape of mercury gas from a EcoLights CFL Recycling Station™ (e.g., 10"×12"×12-24") was explored. Untreated corrugate was used as a mock absorbent liner in the box. Without a sorbent, mercury clearly exits the box. In the experiment (Experiment 15) below, 0.33 molar sorbent was used to line the box.

TABLE 34

Experiment 14

Standard Mason jar □ Large Mason jar □ Uline bag or □ EcoLite bag
100 W bulb□    60 W bulb    4' Tube□

| Time after break | | EcoLights CFL Recycling Station ™ - Escape with Open Port Sorbent: NONE - untreated corrugate CONTROL | |
|---|---|---|---|
| Time | Min. | Hg reading (mg/m3) | |
| 1 bulb break | 0 | 0 | |
| | 15 sec | 0 | |
| | 1 min | 0 | |
| | 2 min | 0 | |
| | 3 min | 0 | |
| | 4 min | 0 | |
| 2 additional bulbs broken | 0 | 0.094 | |
| | 0.5 | 0.191 | |
| | 0.45 | 0.192 | 100% |
| | 2 | 0.152 | 79.00% |
| | 4 | 0.146 | 76.00% |
| | 6 | 0.088 | 46.00% |
| | 10 | 0.03 | 16.00% |
| | 15 | 0.037 | 19.00% |
| | 20 | 0.017 | 8.90% |
| | 25 | 0.008 | 4.20% |

Experiment 15. EcoLights CFL Recycling Station™ collection device—escape with open port with sorbent. Result (Table 35): In this experiment, 0.33 molar corrugate was used to line the CFL collection box. There is a clear effect in reducing escaped mercury. With the collection hole unobstructed, there was a 63% reduction* in the mercury reduced into the room. It is expected that having a partial flexible closure (for example a slit Mylar flap) would dramatically increase the amount of captured mercury and minimize exposure of people in the vicinity of the collection station in the event of bulb breakage.

*This was determined by plotting Hg levels over time. The difference (or separation) in area under the curves between the data with and without the corrugated sorbent divided by the area under the no sorbent curve (the control curve)×100% is the percent reduction of mercury released into the room.

TABLE 35

Experiment 15

| Standard Mason jar ☐ Large Mason jar ☐ Uline bag or ☐ EcoLite bag |
| 100 W bulb☐ 60 W bulb■ 4' Tube☐ |

| Time after break | EcoLights CFL Recycling Station ™ of Exp. 14 - Escape with Open Port Sorbent: Impreg. Conc. Full liner (4 sided) 0.33M corrugate (Used in 42 bulb experiment) | |
|---|---|---|
| Time | Min. | Hg reading (mg/m3) |
| 3 bulb break | 0 | 0 |
|  | 0.25 | 0.15 |
|  | 1 | 0.194 | 100% |
|  | 2 | 0.08 | 41.2% |
|  | 3 | 0.043 | 22.2% |
|  | 4 | 0.007 | 3.6% |
|  | 5 | 0.024 | 12.4% |
|  | 6 | 0.022 | 11.3% |
|  | 7 | 0.017 | 8.8% |
|  | 9 | 0.012 | 6.2% |
|  | 11 | 0.013 | 6.7% |
|  | 13 | 0.011 | 5.7% |
|  | 15 | 0.012 | 6.2% |
|  | 19 | 0.005 | 2.6% |
|  | 22 | 0.009 | 4.6% |

Experiment 16. 4 g SIAC. Result (Table 36): 4 g of SIAC was found to be effective in reducing mercury vapor greater than 95% in 10 minutes. Since the amount of mercury appears to vary from bulb to bulb, and may not be controlled very tightly during the manufacturing process, 4 g per bulb may be the advisable per-bulb amount of sorbent.

TABLE 36

Experiment 16

| ■ Standard Mason jar ☐ Large Mason jar ☐ Uline bag or ☐ EcoLite bag |
| 100 W bulb☐ 60 W bulb■ 4' Tube☐ |

| Time after break | Sorbent: 4 g SIAC | |
|---|---|---|
| Time | Min. | Hg reading (mg/m3) |
| 3:00 | 0 | HL | 100% |
| 3:30 | 10 | 0.35 | 4.60% |
| 3:30 | 30 | 0.021 | 2.70% |
| 4:00 | 60 | 0.021 | 2.70% |
| 5:10 | 130 | 0.008 | 1.00% |
| 7:00 | 240 | 0.008 | 1.00% |

Experiment 17. 2 g SIAC. Result (Table 37): In this experiment 2 g SIAC was used. A 90% reduction in mercury was achieved somewhere between 10 minutes and 60 minutes. This is still an effective amount of SIAC, however obviously not as effective as 4 g.

TABLE 37

Experiment 17

| ■ Standard Mason jar ☐ Large Mason jar ☐ Uline bag or ☐ EcoLite bag |
| 100 W bulb☐ 60 W bulb■ 4' Tube☐ |

| Time after break | Iodide only 0.33M; 100 cm2 bogus paper | |
|---|---|---|
| Time | Min. | Hg reading (mg/m3) |
| 3:00 | 0 | HL | 100% |
| 3:30 | 10 | 0.697 | 9.20% |

TABLE 37-continued

Experiment 17

| 3:30 | 30 | 0.487 | 6.40% |
|---|---|---|---|
| 4:00 | 60 | 0.643 | 8.50% |
| 5:10 | 130 | 0.499 | 6.60% |
| 7:00 | 240 | 0.281 | 3.70% |
| 7:30 | 270 | 0.191 | 2.50% |
| 8:00 | 300 | 0.226 | 3.00% |
| 9:40 | 400 | 0.28 | 3.70% |
| 11:00 | 1060 | 0.294 | 3.90% |

Experiment 18. 3 g SIAC. Result (Table 38): In this last experiment 3 g of SIAC was tested. Approximately 90% reduction in mercury is achieved in 30 to 60 minutes. At 160 minutes, greater than 97% reduction mercury vapor was achieved.

TABLE 38

Experiment 18

| ■ Standard Mason jar ☐ Large Mason jar ☐ Uline bag or ☐ EcoLite bag |
| 100 W bulb☐ 60 W bulb■ 4' Tube☐ |

| Time after break | Iodide only 0.33M; 50 cm2 bogus paper | |
|---|---|---|
| Time | Min. | Hg reading (mg/m3) |
| 7:00 | 0 | HL | 100% |
| 7:12 | 12 | HL | |
| 7:30 | 30 | 0.823 | 10.80% |
| 8:00 | 60 | 0.557 | 7.30% |
| 9:40 | 160 | 0.193 | 2.50% |
| 11:00 | 820 | 0.111 | 1.50% |

References

1. U.S. Patent Application No. 2009/0095133.
2. U.S. Pat. No. 3,194,629.
3. U.S. Pat. No. 4,021,416.
4. Peka, et al., Angewandte Makromolekulare Chemie 44 (1) 67-75 (1975).
5. Yamashita et al., Journal of Polymer Science Part A: Polymer Chemistry, 29 (5) 777-779 (1991).
6. Carrillo et al., Nanotechnology, 16 S416-S421 (2005).
7. U.S. Pat. No. 4,534,944.
8. U.S. Pat. No. 4,876,025.

Although the invention has been described with reference to the above examples, it will be understood that modifications and variations are encompassed within the spirit and scope of the invention. Accordingly, the invention is limited only by the following claims.

What is claimed is:

1. A device for absorption of mercury vapor comprising a substrate containing or impregnated with a first and a second inorganic salt, wherein the first inorganic salt comprises copper ions and the second inorganic salt comprises thiosulfate ions, wherein the thiosulfate ions are present in molar excess over the copper ions, and wherein the first and the second inorganic salt are impregnated in a concentration range of approximately 0.15 molar to 1.5 molar.

2. The device of claim 1, further comprising a third inorganic salt comprising iodide ions.

3. The device of claim 1, further comprising a polyol.

4. The device of claim 3, wherein the polyol is a water soluble polyol selected from the group consisting of: propylene glycol, ethylene glycol, and glycerol.

5. The device of claim 3, wherein the polyol is propylene glycol and impregnated in an amount ranging from 1% to 90%, 5% to 50%, or 10% to 20%.

6. The device of claim 1, wherein the ratio of the thiosulfate ions to the copper ions is between 1:1 to 5:1.

7. The device of claim 1, wherein the substrate comprises a bibulous or a non-bibulous matrix.

8. The device of claim 7, wherein the substrate comprises a bibulous matrix selected from the group consisting of paper, cellulose, cardboard, paperboard, natural fabric, synthetic fabric, natural fleece, and synthetic fleece.

9. The device of claim 7, wherein the substrate comprises a non-bibulous matrix selected from the group consisting of plastic, metal, alloy, glass, or resin.

10. The device of claim 7, wherein the substrate is a bibulous matrix selected from the group consisting of cellulose, clay, vermiculite, or a zeolite.

11. The device of claim 1, wherein the substrate is a particulate.

12. The device of claim 1, wherein the substrate comprises a bibulous matrix configured as an air filter or fume hood filter.

13. A device for absorption of mercury vapor comprising a substrate containing or impregnated with a first and a second inorganic salt, wherein the first inorganic salt comprises copper ions and the second inorganic salt comprises thiosulfate ions, and wherein the device further comprises propylene glycol impregnated in an amount ranging from 1% to 90%, 5% to 50%, or 10% to 20%.

14. A device for absorption of mercury vapor comprising a substrate containing or impregnated with a first and a second inorganic salt, wherein the first inorganic salt comprises copper ions and the second inorganic salt comprises thiosulfate ions, and wherein the first and the second inorganic salt are impregnated in approximately equimolar amounts in a concentration range of approximately 0.15 molar to 1.5 molar.

* * * * *